United States Patent [19]

Inokuchi

[11] Patent Number: 4,862,340
[45] Date of Patent: Aug. 29, 1989

[54] DC POWER TRANSMISSION SYSTEM

[75] Inventor: Haruhisa Inokuchi, Tokyo, Japan

[73] Assignee: Kabushiki Kaisha Toshiba, Kawasaki, Japan

[21] Appl. No.: 26,231

[22] Filed: Mar. 16, 1987

[30] Foreign Application Priority Data

Mar. 14, 1986 [JP] Japan ................... 61-56675

[51] Int. Cl.[4] .............................................. H02J 3/36
[52] U.S. Cl. ....................................... 363/35; 363/37; 363/96; 363/135
[58] Field of Search ................. 363/34, 35, 37, 51, 363/96, 135–139; 323/207

[56] References Cited

U.S. PATENT DOCUMENTS

| 3,935,528 | 1/1976 | Brenneisen et al. | 363/79 |
| 3,967,183 | 6/1976 | Heincke | 363/139 |
| 4,264,951 | 4/1981 | Konishi et al. | 363/51 X |
| 4,386,396 | 5/1983 | Ängquist | 363/136 |
| 4,598,350 | 7/1986 | Sakai et al. | 363/35 |
| 4,600,981 | 7/1986 | Sakai et al. | 363/35 |
| 4,639,848 | 1/1987 | Sakai | 363/35 |
| 4,727,466 | 2/1988 | Sakai et al. | 363/35 |

FOREIGN PATENT DOCUMENTS

| 0075319 | 9/1982 | European Pat. Off. |
| 0156396 | 10/1985 | European Pat. Off. |
| 1513985 | 9/1969 | Fed. Rep. of Germany |
| 50-107443 | 8/1975 | Japan |
| 58-46956 | 10/1983 | Japan |

OTHER PUBLICATIONS

"Instantaneous Reactive Power Compensators Comprising Switching . . . ", H. Akagi et al., IEEE Transactions on Industry Applications, vol. IA-20, No. 3, Part 1, May/Jun. 1984, pp. 625–630, N.Y.

Primary Examiner—Patrick R. Salce
Assistant Examiner—Emanuel Todd Voeltz
Attorney, Agent, or Firm—Foley & Lardner, Schwartz, Jeffery, Schwaab, Mack, Blumenthal & Evans

[57] ABSTRACT

In a DC power transmission system wherein two AC systems are interconnected by a first converter, a DC transmission line and a second converter to transmit power from one of the AC systems to the other of the AC systems via the DC transmission line, the DC power transmission system is provided wherein at least one of the first and second converters operating as an inverter is a current type self-commutated converter capable of being pulse-width controlled, the reactive power of the current type self-commutated converter is regulated by controlling a phase difference angle between its AC voltage and current, the DC voltage is regulated by pulse-width controlling the current type self-commutated converter, and the DC current is regulated by the converter operating as a rectifier.

11 Claims, 5 Drawing Sheets

DC POWER TRANSMISSION SYSTEM

BACKGROUND OF THE INVENTION

1. Field of the Invention

The present invention relates to a DC power transmission system interconnecting two AC systems.

2. Description of the Prior Art

In a DC power transmission system, a first external commutated converter operating as a rectifier and a second external commutated converter operating as an inverter are connected with each other at their DC sides via DC reactors and a DC transmission line. Each converter is connected at its AC side to an AC system via a transformer and a circuit breaker.

Control system controlling the converters has an interchange power control system at the first converter and a margin angle control system at the second converter.

The interchange power control system controls the DC output current of the first converter operating as a rectifier to make the active interchange power measured at the AC system of the first converter have a set value. On the other hand, the margin angle control system controls the lead angle of the second converter to have a margin angle sufficient for preventing commutation of the second converter from failing. A margin angle controller is well known as described, for example, in Japanese Patent Publication No. 46956/1983.

The margin angle control system maintains a proper margin angle of the second converter and determines a DC voltage of the DC transmission line, while the interchange power control system controls the DC current. Consequently, a stable operation of the DC power transmission system can continue. Such a control system is a known technique as described, for example, in Japanese Patent Application Laid-Open No. 107443/1975.

An external commutated converter used for interconnection between two AC systems and operating as an inverter is a lagging power factor load as seen from the AC system so that it receives necessary reactive power from the AC system. Conventionally, in such a case, technical concept for controlling the reactive power of the converter has not been employed.

SUMMARY OF THE INVENTION

It is therefore an object of the present invention to provide a DC power transmission system which can operate in a stable manner while controlling the reactive power required by the converter and the interchange power between the two AC systems.

To achieve the above object, according to the aspect of the present invention, a current type self-commutated converter capable of PWM (Pulse Width Modulation) controlling is used as the converter operating as an inverter, wherein the reactive power for the converter is regulated by controlling the voltage and current at its AC system, the DC voltage is regulated by PWM controlling the converter, and the DC current is regulated by controlling the other converter operating as a rectifier.

Use of a current type self-commutated converter as the converter operating as an inverter and provision of control means for the reactive power thereof, enable to provide a DC power transmission system capable of operating in a stable manner while controlling the reactive power of the converter without affecting the capabilities of controlling the voltage and current in the system.

DETAILED DESCRIPTION OF THE PREFERRED EMBODIMENTS

First Embodiment

Figure 1:
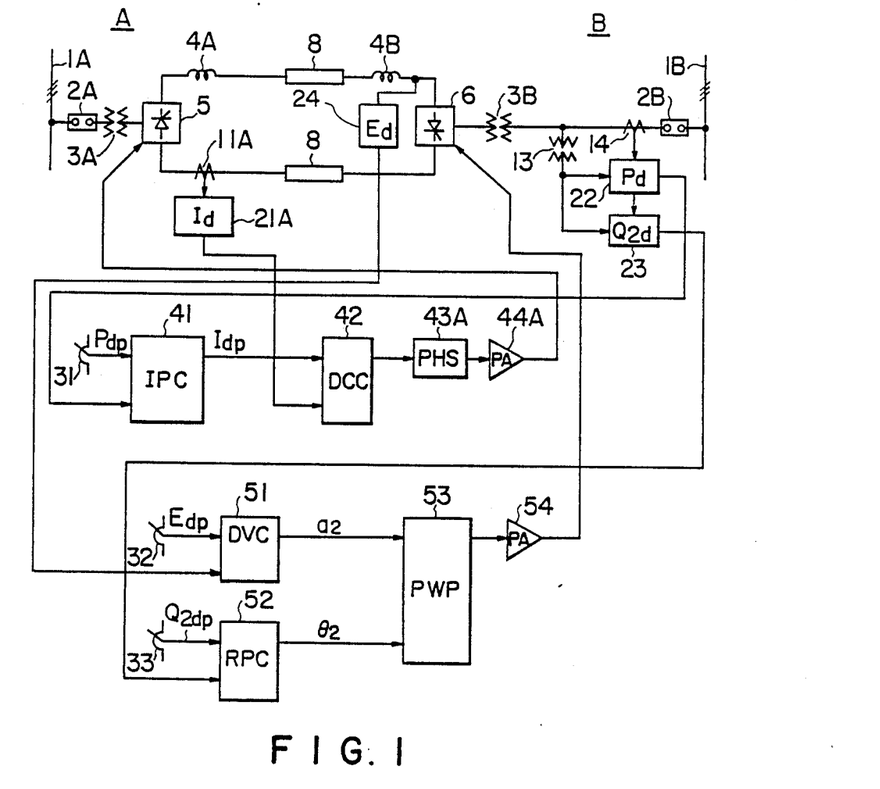
FIG. 1 is a block diagram showing a first embodiment of the DC power transmission system according to the present invention.
Figure 2:
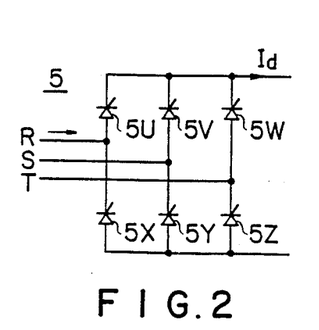
FIG. 2 is a circuit diagram of the first converter shown in FIG. 1.
Figure 3:
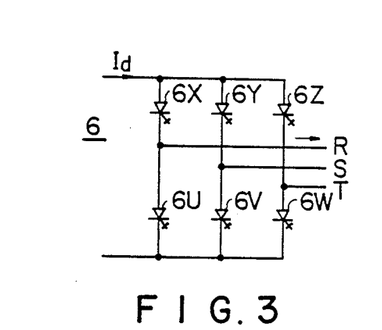
FIG. 3 is a circuit diagram of the second converter shown in FIG. 1.

The fundamental circuit of the DC power transmission system as constructed in accordance with the first embodiment of this invention and the block diagram of the control systems, are shown in FIG. 1. In the fundamental circuit of FIG. 1, a converter 5 operating as a rectifier at A side may be a current type self-commutated converter or an external commutated converter. The converter 5 will be assumed as an external commutated converter for convenience of the following description. As a converter 6 operating as an inverter, a current type self-commutated converter is provided at B side. The converter 5 is composed, as shown in FIG. 2, of six thyristors 5U, 5V, 5W, 5X, 5Y and 5Z in three-phase bridge connection. Whereas the converter 6 is composed, as shown in FIG. 3, of six gate-turn-off tyristors 6U, 6V, 6W, 6X, 6Y and 6Z in three-phase bridge connection. DC reactors 4A and 4B are provided at DC side of the converters 5 and 6. The converters, DC reactors and DC transmission lines constitute a closed circuit. The AC sides of the converters 5 and 6 are respectively connected to AC systems 1A and 1B via transformers 3A and 3B and circuit breakers 2A and 2B.

An interchange power control system controlling the external commutated converter 5 is equipped with an interchange power control circuit (IPC) 41 which outputs a reference DC current $I_{dp}$ by which an active interchange power $P_d$ is made equal to a reference interchange power $P_{dp}$ set by interchange power setting device 31, the active interchange power $P_d$ being detected by an active power detector 22 which is inputted with a voltage and a current picked up by a potential transformer 13 and a current transformer 14 both provided on the side of the transformer 3B at the converter 6. The actual DC current of the DC power transmission line 8 is detected by a DC current transformer 11A and a DC current detector 21A. To make this actual DC current equal to the above-described reference DC current $I_{dp}$, the converter 5 is controlled by means of a DC current control circuit (DCC) 42, a phase control circuit (PHS) 43A and a pulse amplifier circuit (PA) 44A.

Figure 4:
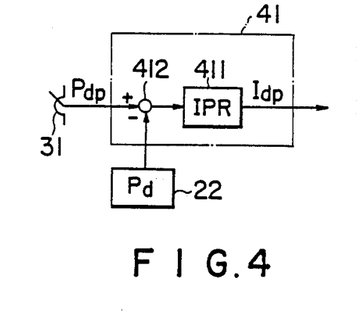
FIGS. 4 and 5 are block diagrams showing interchange power control circuits each different in configuration.
Figure 5:
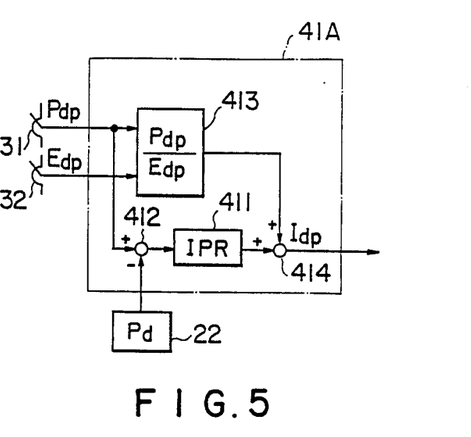

A particular circuit configuration of the interchange power control circuit 41 is shown in FIG. 4. In the interchange power control circuit 41 shown in FIG. 4, the active interchange power $P_d$ detected by the active power detector 22 and the reference interchange power $P_{dp}$ set by the interchange power setting device 31 are added together by an adder 412 to obtain a difference therebetween which is amplified by an interchange power regulator (IPR) 411 to obtain the reference DC current $I_{dp}$ for control of the interchange power. Since the DC voltage in the DC power transmission system of this type is maintained substantially constant, another interchange power control circuit 41A shown in FIG. 5 may be used wherein the reference interchange power $P_{dp}$ set by the interchange power setting device 31 is divided by a reference DC voltage $E_{dp}$ in a normal operation set by a DC voltage setting device 32 by a divider 413 to calculate $P_{dp}/E_{dp}$ which is added to the output from an interchange power regulator 411 by an adder 414 to obtain the reference DC current $I_{dp}$.

Figure 6:
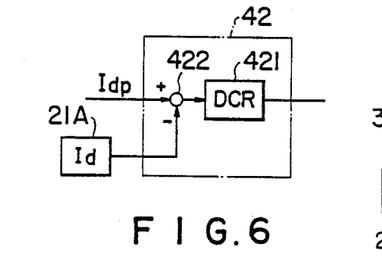
FIG. 6 is a block diagram showing a DC current control circuit in the FIG. 1.

A particular circuit configuration of the DC current control circuit 42 is shown in FIG. 6. As seen from the Figure, in this control circuit, the DC current $I_d$ detected by the DC current detector 21A and the reference DC current $I_{dp}$ from the interchange power control circuit 41 are added together by an adder 422 to obtain a difference therebetween which is then amplified by a DC current regulator (DCR) 421 and supplied to the phase control circuit 43A.

The phase control circuit 43A determines, based on the output from the DC current control circuit 42, the angle of lag $\alpha$ of the external commutated converter 5 to control the firing timing of the converter via the pulse amplifier circuit 44A in the manner as described previously.

Referring now back to FIG. 1, the control factor $a_2$ and the phase difference angle $\theta_2$ between AC voltage and current, of the self-commutated converter 6 are controlled, respectively by a DC voltage control circuit (DVC) 51 inputted with a reference voltage $E_{dp}$ set by a DC voltage setting device 32, and a reactive power control circuit (RPC) 52 inputted with a reference value $Q_{2dp}$ set by a reactive power setting device 33. The control factor $a_2$ and the phase difference angle $\theta_2$ are inputted to a pulse width phase control circuit (PWP) 53 for further processing and then supplied to the converter 6 via an on-off pulse amplifier circuit (PA) 54.

Figure 7:
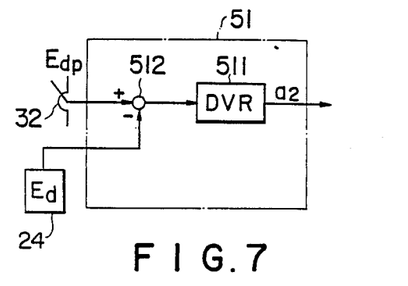
FIGS. 7, 8 and 9 are block diagrams showing DC voltage control circuits each different in configuration.

In the DC voltage control circuit 51, for example, as shown in FIG. 7, the reference DC voltage $E_{pd}$ set by the DC voltage setting device 32 and the DC voltage $E_d$ detected by the DC voltage detector 24 are added together by an adder 512 to obtain a difference therebetween which is then supplied to a DC voltage regulator (DVR) 511 to obtain the control factor $a_2$. This control factor $a_2$ determines the pulse width of an output signal from the converter 6.

Figure 10:
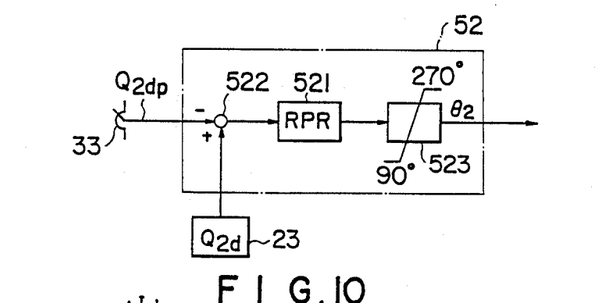
FIG. 10 is a block diagram showing a reactive power control circuit.

For example, the reactive power of the current type self-commutated converter 6 is controlled in the reactive power control circuit 52, as shown in FIG. 10. A reference reactive power set by a reactive power setting device 33 and a reactive power consumed by the converter and detected by a reactive power detector 23 are added together by an adder 522 to obtain a difference therebetween which is then inputted to a reactive power regulator (RPR) 521 and a limiter 523 to obtain the phase difference angle signal $\theta_2$. The limiter 523 is provided for limiting the phase difference angle between AC voltage and current to 90 to 270 degrees or to $-90$ to $+90$ degrees in electric angle. In this embodiment, the angle is limited to 90 to 270 degrees.

The pulse width phase control circuit 53 is inputted with the control factor $a_2$ from the DC voltage control circuit 51 and the phase difference angle $\theta_2$ from the reactive power control circuit 52, and outputs timing pulses which determine the pulse width and phase difference angle of an output of the converter to control the turning-on and -off of each thyristor of the converter through the on-off pulse amplifier circuit 54.

Figure 11:
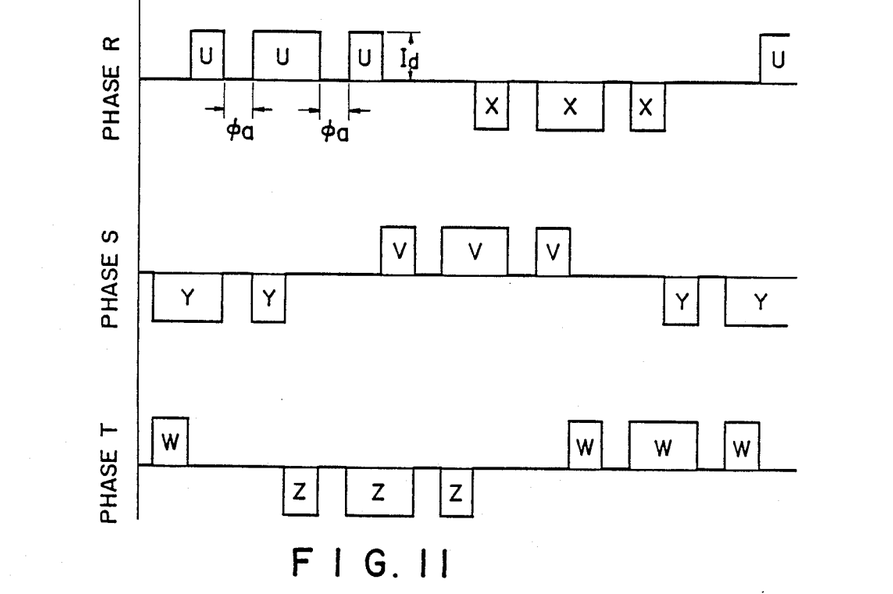
FIG. 11 is a timing chart showing current conduction at each phase and at each arm of the current type self-commutated converter under PWM control.

There are many known pulse width control methods. In this embodiment, AC current waveforms of the current type self-commutated converter are exemplarily shown in FIG. 11, wherein each of instantaneous waveforms U to Z at each conduction arm (conductive thyristor) corresponds to that of each thyristor represented by 6U to 6Z in FIG. 3. An AC current of rectangular waveform having an electrical angle of 120 degrees flows in an external commutated converter, neglecting a commutating overlapping angle. However, in the case of a current type self-commutated converter, a no-current period $\Phi_a$ will be present due to pulse width control, as shown in FIG. 11. This no-current period $\Phi_a$ is controlled by the control factor $a_2$. The control factor $a_2$ and the phase difference angle $\theta_2$ (corresponding to the control angle of lag $\alpha$ of an external commutated converter) between AC fundamental current and voltage of the current type self-commutated converter 6, are controlled by the pulse width phase control circuit 53.

Figure 12:
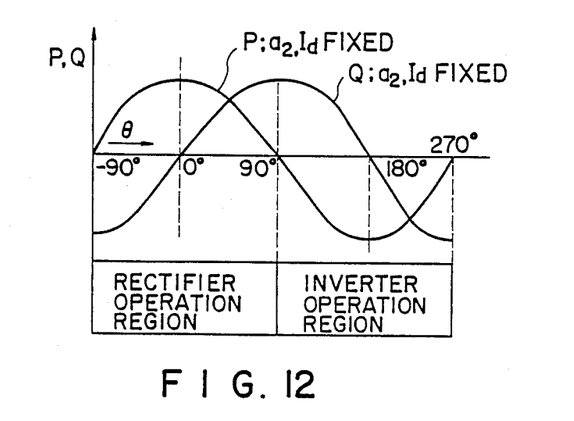
FIG. 12 illustrates the operation region of the current type self-commutated converter.

The active and reactive powers P and Q received from and sent to the AC system of the current type self-commutated converter controlled as described above, are given by the following, known equations. The operational region thereof is illustrated in FIG. 12.

$$P = a_2 \cdot E_{do} \cdot I_d \cdot \cos \theta_2$$

$$Q = a_2 \cdot E_{do} \cdot I_d \cdot \sin \theta_2$$

wherein Edo is a so-called DC voltage at no-load of the current type self-commutated converter 6 and is represented by $E_{AC} 3\sqrt{2}/\pi$ ($E_{AC}$ is AC voltage). $I_d$ is a DC current flowing to the DC side through the converter 6.

According to the control systems of this invention, the DC current $I_d$ controls the control angle of the converter 5 at the AC system 1A, while the interchange power is controlled by the interchange power control circuit 41 and the DC current control circuit 42 in such a manner that it follows the reference interchange power $P_{dp}$ set by the interchange power setting device 31.

The DC voltage $E_d$ of the converter 6 is given by $E_d = a_2 \cdot E_{do} \cdot \cos \theta_2$. Assume that the reactive power of the converter 6 received from and sent to the AC system is controlled so as to follow the reference reactive power $Q_{2dp}$ by the reactive power control circuit 52. Then, the phase difference angle $\theta_2$ is correspondingly controlled. If the reference DC voltage $E_{dp}$ is increased, an output signal from the adder 512 in the DC voltage control circuit 51 shown in FIG. 7 also increases. Therefore, the DC voltage regulator 511 operates to increase the control factor $a_2$ to thereby control the DC voltage to follow the reference DC voltage $E_{dp}$. Conversely, if the reference DC voltage $E_{dp}$ is decreased, the operation is in reverse relation to the above, so that the DC voltage $E_d$ is controlled to follow the reference DC voltage $E_{dp}$.

The DC voltage is regulated, as described previously, by controlling the control factor $a_2$ by the DC voltage control circuit 51. The operation of the reactive power control circuit 52 will be discussed in this connection,. It is here assumed that the current type self-commutated converter 6 operates so as to receive lagging reactive power from the AC system. In this case, if the reference reactive power $Q_{2dp}$ is increased, an output signal from the adder 522 in the reactive power control circuit 52 shown in FIG. 10 decreases. Therefore, the reactive power regulator 521 operates to decrease its phase difference angle $\theta_2$, and the reactive power is controlled to follow the reference reactive power $Q_{2dp}$ and is increased. Conversely, if the reference reactive power $Q_{2dp}$ is decreased, the operation is in reverse relation to the above operation, so that the reactive power is controlled to follow the reference reactive power and is decreased.

As described so far, the interchange power control circuit 41 controls the reference DC current to obtain a current necessary for controlling the interchange power, in association with the DC voltage controlled under the DC voltage control circuit 51, while the DC current control circuit 42 controls the DC current to follow the reference DC current. In addition, the reactive power of the current type self-commutated converter 6 is controlled under the reactive power control circuit 52.

According to the embodiment described above, not only the interchange power of the DC power transmission system is controlled, but also the reactive power of the current type self-commutated converter itself is controlled. As a result, the AC system connected to the current type self-commutated converter can be controlled stably using reactive power.

Modification

In the above embodiment, the converter at the AC system 1A has been described, for convenience of description, as an external commutated converter. However, the converter 5 may also be a current type self-commutated converter. In this case, instead of the phase control circuit 43 and the pulse amplifier circuit 44, a pulse width phase control circuit (represented by 53 in FIG. 1) and an on-off pulse amplifier circuit (represented by 54 in FIG. 1) are used wherein the phase difference angle between AC voltage and current at the converter 5 is controlled using the DC current control circuit 42.

Further, if the converter 5 at rectifier operation mode is to receive lagging reactive power from the AC system, the phase difference angle is limited to 0 to 90 degrees, whereas if it is to supply lagging reactive power to the AC system, the phase difference angle is limited to $-90$ to 0 degree, as is apparent from FIG. 12.

Figure 13:
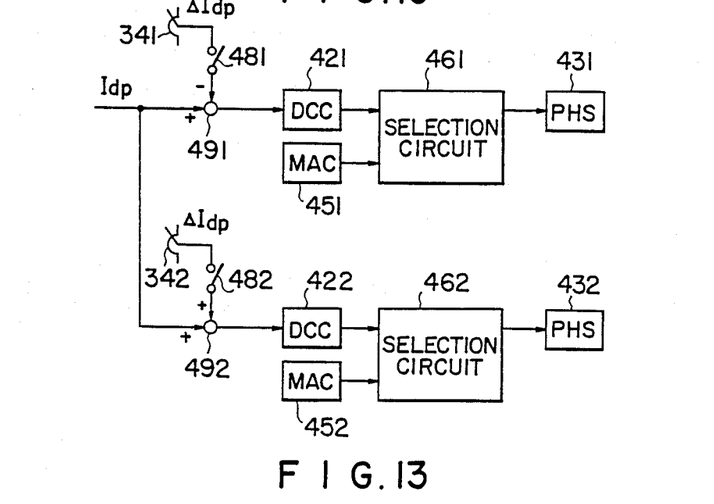
FIG. 13 is a block diagram of a control circuit for reversing power flow.

In a DC power transmission system, it is common not only to transmit the interchange power from the AC system 1A to the AC system 1B, but also to transmit it from the AC system 1B to the AC system 1A. If such control is required, as shown in FIG. 13, there are provided at both converters DC current control circuits 421 and 422, margin angle control circuits 451 and 452, selection circuits 461 and 462 for automatically selecting smaller control angle of lag, and current margin setting devices 341 and 342, whereby switch 482 or 481 at the converter to be operated as an inverter is closed to give a current margin $\Delta I_{dp}$. In the foregoing description, for convenience of description, it has been assumed that the converter 5 operates as a rectifier, whereas the converter 6 operates as an inverter by limiting the phase difference angle to 90 to 270 degrees by the limiter 523 provided in the reactive power control circuit 52. However, if the phase difference angle is limited to $-90$ to 90 degrees by the limiter 523, the converter 6 can be operated as a rectifier. Further, irrespective of the type of the converter 5, i.e., an external commutated converter or a current type self-commutated converter, the converter 5 automatically operates as an inverter under control of the DC current control circuit 42. Thus, it is apparent that the present invention is also applicable to the case where the interchange power is transmitted from the AC system 1B to the AC system 1A.

In the above-described embodiment, although the interchange power is detected at the AC system of the current type self-commutated converter, such detection may be made at the DC power transmission system or at other circuit portions.

In the foregoing description, as the DC voltage control circuit 51, the control circuit shown in FIG. 7 is used wherein a difference between the reference DC voltage $E_{dp}$ and the detected DC voltage $E_d$ is amplified and the DC voltage is controlled to follow the reference DC voltage. However, the circuit configuration may be that shown in FIG. 8 or FIG. 9.

Figure 8:
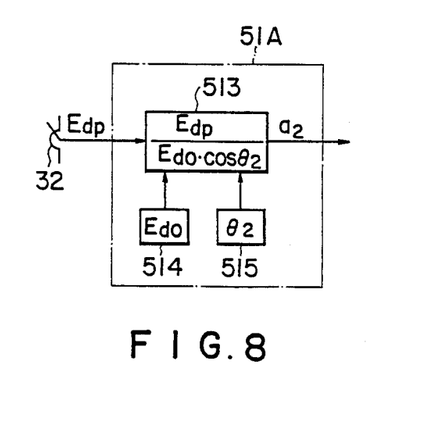

In a DC voltage control circuit 51A shown in FIG. 8, the control factor $a_2$ is calculated from a reference DC voltage $E_{dp}$, a no-load voltage $E_{do}$ and a phase difference angle $\theta_2$, based on the fact that the DC voltage can be calculated as $a_2 \cdot E_{do} \cdot \cos \theta_2$. The reference DC voltage $E_{dp}$ is set by the DC voltage setting device 32. The no-load voltage $E_{do}$ is constant assuming that the AC voltage at the current type self-commutated converter 6 is constant, or has such a value to be obtained by detecting the AC voltage. The phase difference angle $\theta_2$ may use a value of an input signal to the pulse width phase control circuit 53.

Figure 9:
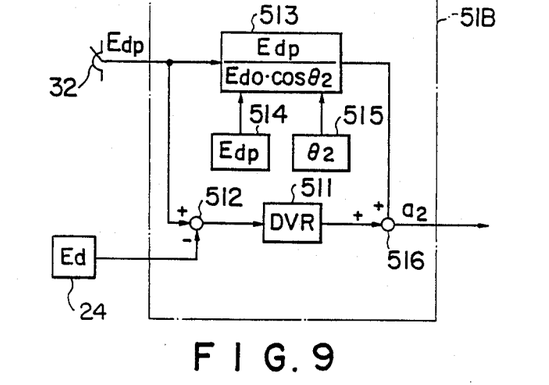

A DC voltage control circuit 51B shown in FIG. 9 is constructed by combining the circuits of FIGS. 7 and 8, wherein the control factor $a_2$ of the current type self-commutated converter 6 is controlled to make the DC voltage $E_d$ follow the reference DC voltage $E_{dp}$.

Second Embodiment

In this embodiment, a stable operation is ensured while controlling the reactive power of the current type self-commutated converter and the interchange power of the DC power transmission system. The embodiment will be described with reference to FIG. 14.

Figure 14:
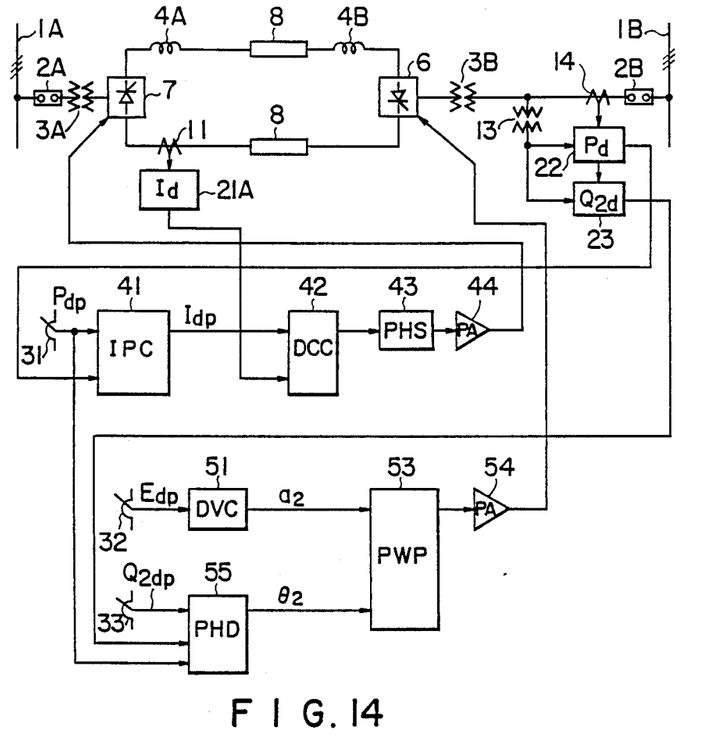
FIG. 14 is a block diagram showing a second embodiment of the DC power transmission system according to the present invention.
Figure 15:
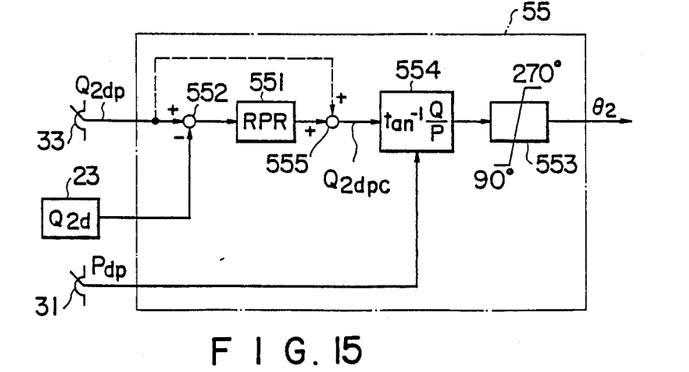
FIG. 15 is a block diagram of the phase difference angle control circuit shown in FIG. 14.

In the system shown in FIG. 14, a characteristic feature resides in that a phase difference angle control circuit (PHD) 55 is provided in place of the reactive power control circuit 52 shown in FIG. 1. The phase difference angle control circuit 55 is composed, as shown in FIG. 15, of an adder 552, a reactive power regulator 551, an operator 554, and a limiter 553. The adder 552 adds together a reference reactive power $Q_{2dp}$ to be consumed by the current type self-commutated converter 6 and set by a reactive power setting device 33, and a reactive power $Q_{2d}$ consumed by the converter 6 and detected by a reactive power detector 23. The reactive power regulator 551 amplifies the difference signal outputted from the adder 522. The operator 554 calculates the $\tan^{-1}$ value using, as its operands, the output signal $Q_{2dpc}$ from the reactive power regulator 551 and the reference interchange power $P_{dp}$. The limiter 553 limits the phase difference angle $\theta_2$ outputted from the operator 554 to 90 to 270 (or $-90$ to 90) degrees. The limiter 553 is assumed to limit the phase difference angle to 90 to 270 degrees, for convenience of description. Other conditions do not differ from those with FIG. 1.

The DC voltage of the converter 6 is given by $E_d = a_2 \cdot E_{do} \cdot \cos \theta_2$, as described previously. Also, the phase difference angle $\theta_2$ is given by using active and reactive powers P and Q, as $\theta_2 = \tan^{-1}(Q/P)$. Consider now the DC voltage control circuit 51, and assuming that the phase difference angle $\theta_2$ of the converter 6 is controlled by the phase difference angle control circuit 55. If the reference DC voltage $E_{dp}$ is increased, an output signal from the adder 512 in the DC voltage control circuit 51 shown in FIG. 7 increases, so that the DC voltage regulator 511 operates to increase the control factor $a_2$ and controls the DC voltage Ed to follow the reference DC voltage $E_{dp}$. Conversely, if the reference DC voltage $E_{dp}$ is decreased, the operation is in reverse relation to that described above so that the DC voltage $E_d$ is controlled to follow the reference DC voltage $E_{dp}$.

The DC voltage is regulated, as described just now, by controlling the control factor $a_2$ by the DC voltage control circuit 51. Now, the operation of the phase difference angle control circuit 55 will be described. It is here assumed that the converter 6 is operated by receiving the lagging reactive power from the AC system. If the reference reactive power $Q_{2dp}$ is increased, an output signal from the adder 552 in the phase difference angle control circuit 55 shown in detail in FIG. 15 increases so that the output signal $Q_{2dpc}$ from the reactive power regulator 551 also increases. Whereas since the reference interchange power $P_{dp}$ inputted to another input of the operator 554 is constant, the phase difference angle $\theta_2 = \tan^{-1}(Q_{2dpc}/P_{dp})$ calculated by the operator increases to control the reactive power to follow the reference reactive power. Conversely, if the reference reactive power is decreased, the operation is in reverse relation to the above, so that the reactive power is controlled to follow the reference reactive power.

As described so far, the interchange power control circuit 41 controls the reference DC current to obtain a current necessary for controlling the interchange power, in association with the DC voltage controlled under the DC voltage control circuit 51, while the DC current control circuit 42 controls the DC current to follow the reference DC current. In addition, the reactive power of the current type self-commutated converter 6 is controlled under the phase difference angle control circuit 55.

As seen from the above, also in the embodiment shown in FIG. 14, not only the interchange power between the two AC systems is controlled, but also the reactive power of the current type self-commutated converter itself is controlled. Further, controlling or stabilizing the AC system connected to the current type self-commutated converter by the reactive power, is achieved by controlling the reference reactive power.

Various modifications stated with the first embodiment are also applicable to the second embodiment.

In the second embodiment described so far, the reference reactive power $Q_{2dp}$ may be directly added to the adder provided at the output of the reactive power regulator 551 in the phase difference angle control circuit shown in FIG. 15. By doing so, a change in the reference reactive power is directly inputted to the adder 554 without supplying it to the reactive power regulator 551, so that a quick response to a change in the reference reactive power becomes possible.

Further, instead of using the reactive power regulator 551 in the phase difference angle control circuit 55, the reference reactive power may be directly inputted to the operator 554, which results in the same advantage as above. Furthermore, instead of the reference interchange power $P_{dp}$ for the second input of the operator 554, obviously the detected value $P_d$ may be used similarly. In summary, irrespective of whether the phase difference angle of the current type self-commutated converter is a reference value or a detected value, control may be conducted based on a ratio of the reactive power of the current type self-commutated converter to the interchange power between the AC systems.

According to the present invention, a DC power transmission system, which can interchange the interchange power between the AC systems in a stable manner, can be realized by controlling the phase difference angle with the reactive power control circuit or the phase difference control circuit to control the reactive power of the current type self-commutated converter, by controlling the control factor of the current type self-commutated converter with the DC voltage control circuit to control the DC voltage of the DC power transmission system, and by controlling via the other converter the DC current flowing through the DC power transmission system with the DC current control circuit.

I claim:

1. A DC power transmission system wherein two AC systems are interconnected by a first converter, a DC transmission line and a second converter to transmit power from a first AC system to a second AC system via the DC transmission line, and at least one of said first and second converters is a current type self-commutated converter capable of being pulse-width controlled, said DC power transmission system comprising: reactive power control means for controlling a phase difference angle between an AC voltage and current of said current type self-commutated converter so as to make the reactive power of said current type self-commutated converter have a predetermined value; DC voltage control means for controlling the control factor by pulse-width control of said current type self-commutated converter so as to make the DC voltage of said DC transmission line have a predetermined value; and DC current control means for controlling one of said first and second converters operating as a rectifier so as to make the DC current flowing through said DC transmission line have a predetermined value.

2. A DC power transmission system wherein two AC systems are interconnected by a first converter, a DC transmission line and a second converter to transmit power from a first AC system to a second AC system via and DC transmission line, and at least one of said first and second converters is a current type self-commutated converter capable of being pulse-width controlled, said DC power transmission system comprising: phase difference angle control means for controlling a phase difference angle between an AC voltage and current of said current type self-commutated converter so as to make the ratio of the reactive power of said current type self-commutated converter to the interchange power between said AC systems have a predetermined value; DC voltage control means for controlling the control factor by pulse-width control of said current type self-commutated converter so as to make the DC voltage of said DC transmission line have a predetermined value; and DC current control means for controlling one of said first and second converters operating as a rectifier so as to make the DC current flowing through said DC transmission line have a predetermined value.

3. A DC power transmission system according to claim 1, wherein said first converter is an external commutated converter and said second converter is a current type self-commutated converter.

4. A DC power transmission system according to claim 1, wherein said first and second converters each are a current type self-commutated converter.

5. A DC power transmission system according to claim 1, wherein said first and second converters each comprises: DC current control means; margin angle control means; selection means for automatically selecting a smaller control angle of lag; current margin setting means; and switch means for disconnecting said current margin setting means at the converter operating as a rectifier and connecting said current margin setting means at the converter operating as an inverter.

6. A DC power transmission system according to claim 2, wherein said first converter is an external commutated converter and said second converter is a current type self-commutated converter.

7. A DC power transmission system according to claim 2, wherein said first and second converters each are a current type self-commutated converter.

8. A DC power transmission system according to claim 2, wherein said first and second converters each comprises: DC current control means; margin angle control means; selection means for automatically selecting a smaller control angle of lag; current margin setting means; and switch means for disconnecting said current margin setting means at the converter operating as a rectifier and connecting said current margin setting means at the converter operating as an inverter.

9. A method of DC power transmission wherein two AC systems are interconnected by a first converter, a DC transmission line and a second converter to transmit power from a first AC system to a second AC system via the DC transmission line, and at least one of said first and second converters is a current type self-commutated converter capable of being pulse-width controlled, comprising: controlling a phase difference angle between an AC voltage and current of said current type self-commutated converter with a reactive power control system so as to make the reactive power of said current type self-commutated converter have a predetermined value; controlling the control factor by pulse-width control of said current type self-commutated converter with a DC voltage control system so as to make the DC voltage of said DC transmission line have a predetermined value; controlling one of said first and second converters operating as a rectifier with a DC current control system so as to make the DC current flowing through said DC transmission line have a predetermined value.

10. A method of DC power transmission as defined in claim 9, wherein the active power P and reactive power Q are controlled in accordance with the following equations:

$$P = a_2 \cdot E_{do} \cdot I_d \cdot \cos \theta_2$$

$$Q = a_2 \cdot E_{do} \cdot I_d \cdot \sin \theta_2$$

in which DC voltage is $E_{do}$, DC current is $I_d$, the phase difference angle between AC voltage and AC current is $\theta_2$; and $a_2$ is a control factor.

11. A method of DC power transmission system wherein two AC systems are interconnected by a first converter, a DC transmission line and a second converter to transmit power from a first AC system to a second AC system via the DC transmission line, and at least one of said first and second converters is a current type self-commutated converter capable of being pulse-width controlled, comprising: controlling a phase difference angle between an AC voltage and current of said current type self-commutated converter with a phase difference angle control system so as to make the ratio of the reactive power of said current type self-commutated converter to the interchange power between said AC systems have a predetermined value; controlling the control factor by pulse-width control of said current type self-commutated converter with a DC voltage control system so as to make the DC voltage of said DC transmission line have a predetermined value; controlling one of said first and second converters operating as a rectifier with a DC current control system so as to make the DC current flowing through aid DC transmission line have a predetermined value.

* * * * *